(No Model.) 6 Sheets—Sheet 1.

H. HAUSSHÄLTER.
SPEED AND DISTANCE MEASURING AND RECORDING APPARATUS.

No. 512,439. Patented Jan. 9, 1894.

(No Model.) 6 Sheets—Sheet 2.

H. HAUSSHÄLTER.
SPEED AND DISTANCE MEASURING AND RECORDING APPARATUS.

No. 512,439. Patented Jan. 9, 1894.

(No Model.) 6 Sheets—Sheet 3.

H. HAUSSHÄLTER.
SPEED AND DISTANCE MEASURING AND RECORDING APPARATUS.

No. 512,439. Patented Jan. 9, 1894.

Witnesses:
Geo. T. Pinckney
J. Staib

Inventor:
Hugo Hausshälter
per Lemuel W. Serrell
Atty (No Model.) 6 Sheets—Sheet 4.

H. HAUSSHÄLTER.
SPEED AND DISTANCE MEASURING AND RECORDING APPARATUS.

No. 512,439. Patented Jan. 9, 1894.

Witnesses:
Geo. T. Pinckney
J. Staib

Inventor:
Hugo Hausshälter
per Lemuel W. Serrell
att.

THE NATIONAL LITHOGRAPHING COMPANY,
WASHINGTON, D. C.

(No Model.) 6 Sheets—Sheet 5.

H. HAUSSHÄLTER.
SPEED AND DISTANCE MEASURING AND RECORDING APPARATUS.

No. 512,439. Patented Jan. 9, 1894.

Fig. 17.

(No Model.) 6 Sheets—Sheet 6.

H. HAUSSHÄLTER.
SPEED AND DISTANCE MEASURING AND RECORDING APPARATUS.

No. 512,439. Patented Jan. 9, 1894.

UNITED STATES PATENT OFFICE.

HUGO HAUSSHÄLTER, OF DRESDEN, GERMANY.

SPEED AND DISTANCE MEASURING AND RECORDING APPARATUS.

SPECIFICATION forming part of Letters Patent No. 512,439, dated January 9, 1894.

Application filed February 24, 1892. Serial No. 422,697. (No model.) Patented in Germany December 5, 1885, No. 36,799; in Austria-Hungary October 26, 1886, No. 23,026 and No. 52,712, and August 22, 1892, No. 42,725 and No. 31,738; in France August 27, 1891, No. 215,769; in Switzerland September 7, 1891, No. 3,950; in Belgium October 2, 1891, No. 96,637; in England December 28, 1891, No. 22,632, and in Italy December 31, 1891, LX, 76.

*To all whom it may concern:*

Be it known that I, HUGO HAUSSHÄLTER, a subject of the King of Saxony, and residing at Dresden, in the Kingdom of Saxony, German Empire, have invented certain new and useful Improvements in Speed-Measuring and Distance-Recording Apparatus, of which the following is a specification.

This invention has been patented to me in the following countries, viz: Germany, dated December 5, 1885, No. 36,799, and patent of addition, dated July 26, 1891, No. 62,973; Austria-Hungary, dated October 26, 1886, No. 23,026 and No. 52,712, and August 22, 1892, No. 42,725 and No. 31,738; Great Britain, dated December 28, 1891, No. 22,632; Switzerland, dated September 7, 1891, No. 3,950; Italy, dated December 31, 1891, Vol. LX, No. 76; France, dated August 27, 1891, No. 215,769, and Belgium, dated October 2, 1891, No. 96,637.

My invention relates to an apparatus to be used upon locomotive engines or other vehicles for visibly indicating to the engineer or other person the speed of travel, and for recording said speed and also the distances traveled and intervals of time, so that a permanent record of the speed, time, and distance may be had, forming a basis for the regulation, control, and improvement of the service.

In carrying out my invention I employ mechanism actuated by the driving wheel of the engine in proportion to its speed, which mechanism raises a drop bolt to a height proportionate to the speed, and an index hand is operated by said drop bolt and caused to sweep over the face of an index so as to indicate the rate of speed upon said index, and simultaneously with the movement of the index hand a device adapted to puncture a strip of paper having numbered lines agreeing with the index, is moved across the face of said paper strip and caused to puncture the same on lines that agree with the position of the index hand at the time the puncture is made and which make a record of the rate of speed.

The mechanism actuated from the driving shaft operates a mechanism for winding up a spring that in turn sets in motion an escapement and balance wheel or clock mechanism and rotates a spindle upon which the drop bolt is moved vertically along a key, and rotates with said spindle, the clock mechanism causing a constant speed of rotation to be imparted to said spindle and drop bolt and which spindle in turn actuates a train of speed-reducing gear that feeds along the paper strip with a constant progressive movement, the feed roller carrying equidistant peripheral pins which impress the paper strip with dots representing actual periods of time, such for instance as three minute intervals. The mechanism actuated from the driving shaft also operates a ratchet and pawl and accompanying mechanism having a penetrating point which punctures the strip of paper with dots more or less close together according to the speed and indicating miles or kilometers or fractions thereof. All of this mechanism and the operations thereof are hereinafter more particularly described.

In the drawings, Figure 1 is a front elevation illustrating my speed measuring and distance recording apparatus. Fig. 1ª is a similar front elevation with the glass face and frame, the index, the index hand, and the slotted plate to which the same is attached removed so as to show in elevation the interior mechanism more perfectly. Fig. 4 is a partial sectional plan at the line 4—4 of Fig. 1. Figs. 5 and 6 are views illustrating the application of the device to a locomotive engine. Fig. 7 is a sectional plan of the mechanism for actuating the alarm. Fig. 9 is a front elevation, Fig. 15 is an inverted plan of the cam and ratchet separately that form part of the mechanism of Figs. 9 to 13 inclusive. Figs. 17 to 22 inclusive are shown of larger size for clearness.

Figures 1A, 23:
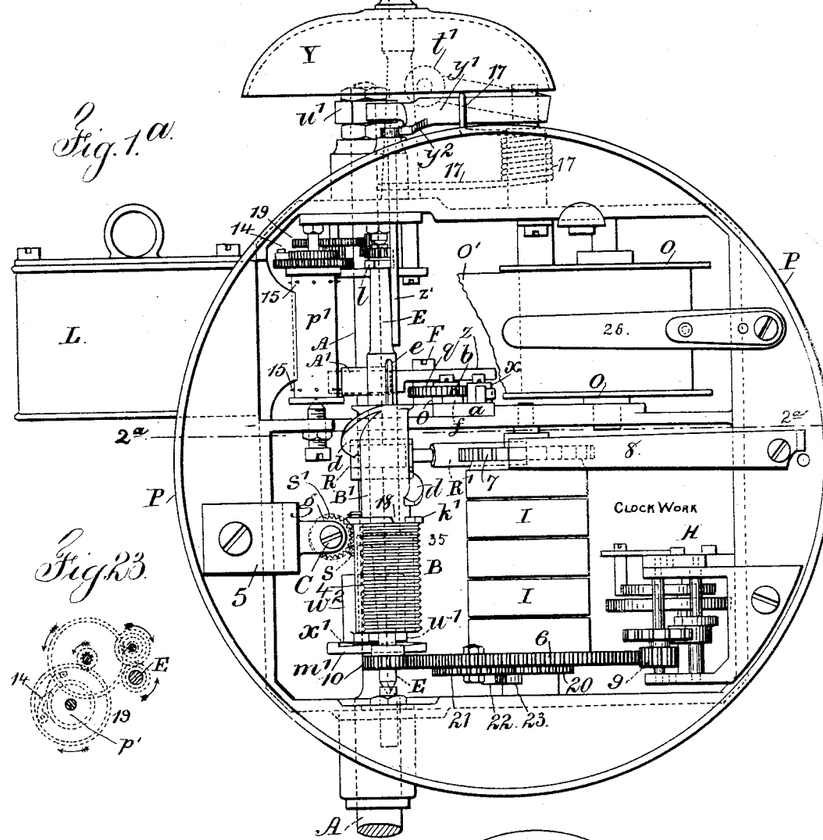
Fig. 23 shows by dotted lines the train of gear for drawing along the strip of paper.

My improved speed measuring and distance recording apparatus is illustrated with special reference, as in Figs. 5 and 6, to a locomotive engine where the same is shown as operated by a crank and pin 31 from the driving wheel 32 of the engine through a series of bevel wheels 33 and a spindle A, the device being located in the cab of the engine presumably alongside of the engineer. A metal casing P is provided with a removable glass face and frame P', and the casing P contains the recording mechanism and it can be secured in place in any desired manner. The spindle A passes up through this casing P. A disk $m'$ with inclined teeth $x'$ is secured to this spindle A and a sleeve $w^2$ surrounds the spindle A and has connected to it a forked rest block $w'$ which extends out toward the auxiliary spindle E (see Figs. 3 and 4) which is vertical and is within the casing P, the forked end of the said rest block $w'$ straddling the auxiliary spindle E. The rotation of the disk $m'$ with its inclined teeth below the rest-block $w'$ operates as a cam and raises and lets fall the sleeve $w^2$ and forked rest block $w'$. Upon this spindle A is a worm gear $s$ and above the same also on the spindle A is an eccentric R, Figs. 2ª and 3 which eccentric carries a pawl R' which engages the ratchet wheel 7. Farther up on the spindle A (Figs. 1ª and 3) is a cam A' and upon the end of the spindle outside of the casing P is a cam $u'$, the office of these parts being hereinafter more particularly described.

The auxiliary spindle E is supported in suitable end bearings, and the same is provided with a key $e$ running part of its length. Around the auxiliary spindle E is the drop bolt B and the same is provided with an integral sleeve B' around whose outer surface is the helical incline $d$, the upper edge of the bolt B having a notched rim $k'$.

Figures 3, 8:
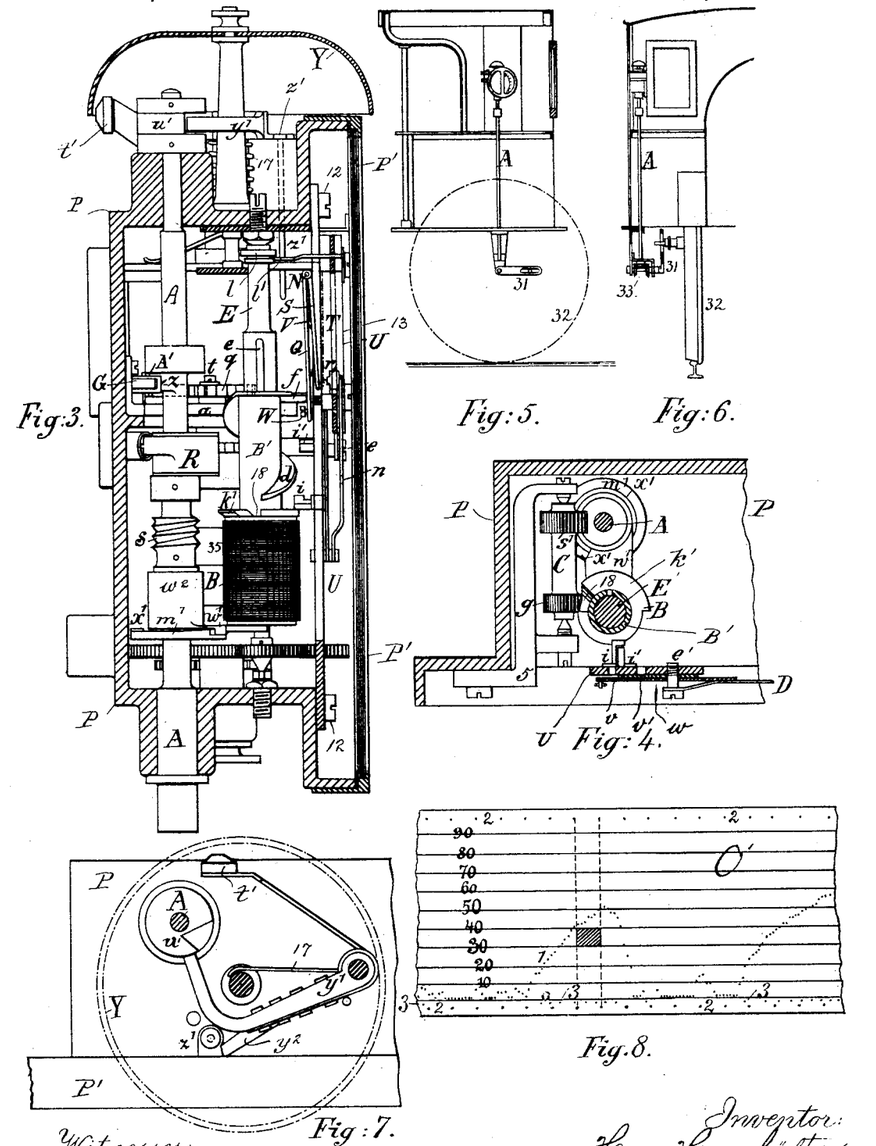
Fig. 3 is a vertical section at the line 3—3, of Fig. 1.
Fig. 8 represents a portion of the strip of paper upon which the record is made.
Figure 9:
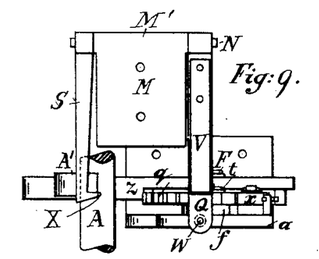
Figure 10:
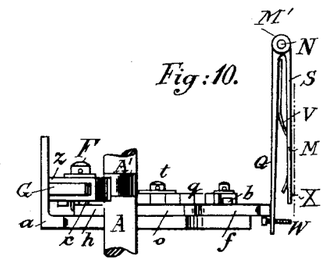
Fig. 10 is a side elevation, and Fig. 11 a plan of the mechanism for perforating the strip of paper with the line of holes 3.
Figure 19:
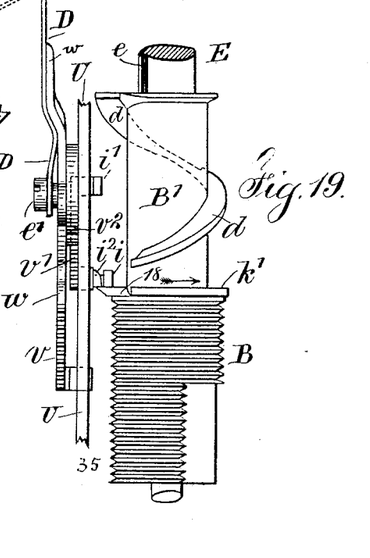
Fig. 19 is a side elevation of the drop bolt and part of the index hand and its racks.
Figure 20:
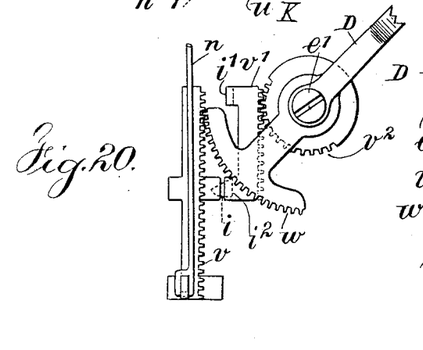
Fig. 20 is an elevation of the racks and part of the index hand.

The drop bolt B is provided with peripheral surface ribs 35 (Figs. 1ª, 3 and 19) that are parallel to each other and that extend more or less around the circumference of said drop bolt in consequence of such ribs being removed at places, so that parts of the surface of said drop bolt are plain and of less diameter than the ribs and all of the ribs have one common starting edge at 4, adjacent to which the plain surface is set back so that when the spindle E and drop bolt B rotate the ribs separate from the lifting pinion $g$ at this edge 4.

A bracket 5 (see Figs. 2ª and 5) secured to the casing P carries the shaft C, and connected to this shaft are a pinion $s'$ and the toothed pinion $g$, the pinion $s'$ meshing with the worm gear $s$ upon the vertical spindle A and the toothed pinion $g$ engaging with the ribs of the drop bolt B. Thus it will be seen that motion is communicated by the revolution of the spindle A to the shaft C and the pinion $g$ and this pinion acts on the ribs of the drop bolt, so that the drop bolt is raised vertically on the auxiliary spindle E, and is disconnected from the pinion $g$ and drops whenever the ends 4 of the annular ribs separate from the pinion by the revolution of the spindle and drop bolt.

Figure 2A:
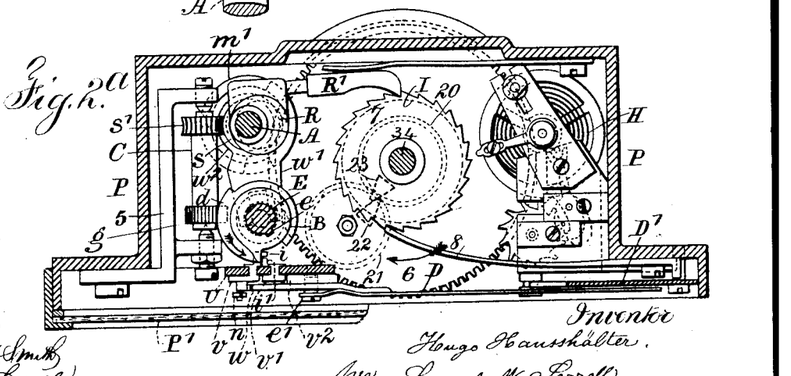
Fig. 2 is a sectional plan at the line 2—2, of Fig. 1.
Figure 16:
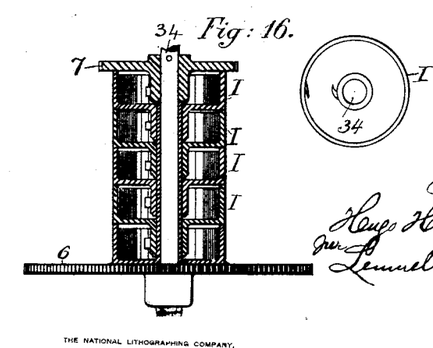
Fig. 16 represents the spring mechanism.

A set of springs and their barrels one above the other on a common central shaft 34, are represented at I, (see Fig. 1ª) the sectional construction of which is shown in Fig. 16. The ratchet wheel 7 and its hub are fastened to the central shaft 34 of the spring barrels and the upper coiled spring is fastened to the hub of this ratchet wheel and to the surrounding spring barrel, and the hub of this upper spring barrel receives the inner end of the second coiled spring and its outer end is fastened to the second surrounding spring barrel, and so on, and the bottom spring barrel is fastened to the gear wheel 6. Hence as the ratchet wheel 7 is rotated by the pawl R', the springs are wound up and held by the pawl 8 engaging said wheel 7 and motion is given to the wheel 6 and by it to the train of clockwork gearing and balance H, (see Figs. 1ª and 2ª) so that the rotation of such wheel 6 is regular while the apparatus is in work and so also the rotation of the pinion 10 and shaft E is regular. I prefer that this shaft E be rotated once in twelve seconds.

It is advantageous to use a stop that will prevent the apparatus running down when the locomotive is standing still; this can be effected by a gear 20 fastened to and rotating with the shaft 34 of the spring barrels and having a stop 23 thereon (see Figs. 1ª and 2ª,) and a gear 21 on a stud on the gear 6 gears with the gear 20 and carries the stop 22. Hence the stops 22 and 23 will come together and prevent the further motion should the wheel 7 and spring barrel shaft remain stationary more than a predetermined period. The wheel 20 rotates more rapidly than the wheel 6 and wheel 21 and the stops keep clear of each other while the mechanism is running continuously, but if the wheel 20 stops with the stopping of the mechanism, the clock-work mechanism goes on until the stops come together by the rotation of the wheels 6 and 21, which as the wheels 20, 21 are the same size, will be in each rotation of the wheel 21 around the wheel 20.

The rotation of the spindle A through the eccentric R and the spring actuated pawl R' winds up the springs I and they in turn rotate the toothed wheel 6, the pinion 10 and the auxiliary spindle E, and the rate of rotation is controlled by the clock-work mechanism with which the toothed wheel 6 is in engagement, so that said spindle E rotates in an exact and predetermined period of time, say twelve seconds. The auxiliary spindle E and drop bolt B and its sleeve B' rotate together in consequence of the key e, and the drop bolt rotates in a regular interval of time, it falls each rotation when the ends 4 of the ribs separate from the pinion g, and the drop bolt B is raised more or less during its rotation according to the speed of the pinion g which is rotated faster or slower in proportion to the speed of the engine.

The strip of paper O' is upon a roller O (see Figs. 1ᵃ and 2) and the same passes between the rollers p p' and is drawn off the roller O by said rollers p p' and passes into a receptacle L in which receptacle there is a curved steel spring 11, shown in Fig. 2, whose office is to guide the strip of paper so that it rolls up as the same is fed into the receptacle. The roller p is a friction roller mounted on the spring frame 13 and the roller p' is a positive motion feed roller. There is a train of gearing 19, shown in Figs. 23 and 1ᵃ, that connects the shaft of the feed roller p' with the auxiliary spindle E, there being in said train of gear a ratchet and pawl 14, so that the feed roller p' is capable of being turned freely by hand in one direction. This feed roller p' has projecting from its surface and near its respective ends, small pins 15 at equal distances apart, which pins 15 engage the two opposite edges of the strip of paper O' (see Figs. 1ᵃ and 2) and puncture the same as the strip of paper is thereby drawn along between the rollers p p' by said train of gear. It will be thus seen that the power of the superposed springs I is communicated through the wheel 6, pinion 10, auxiliary spindle E and the train of gearing 19 (shown in Fig. 23 by a plan and in Fig. 1ᵃ by an elevation) to the feed roller p', and the parts are so proportioned and timed that the spaces between the pins at the respective ends of this roller p' represent periods of time; for instance periods of three minutes, so that from an examination of the paper strip the three minute periods could be readily distinguished by the punctures, and parallel lines as shown by the dotted lines Fig. 8 can if desired be drawn across the paper strip from these punctures so as to divide the strip into three minute divisions and within which lines the punctures indicating speed and distance will appear and their relation to the time be at once apparent.

Figure 17:
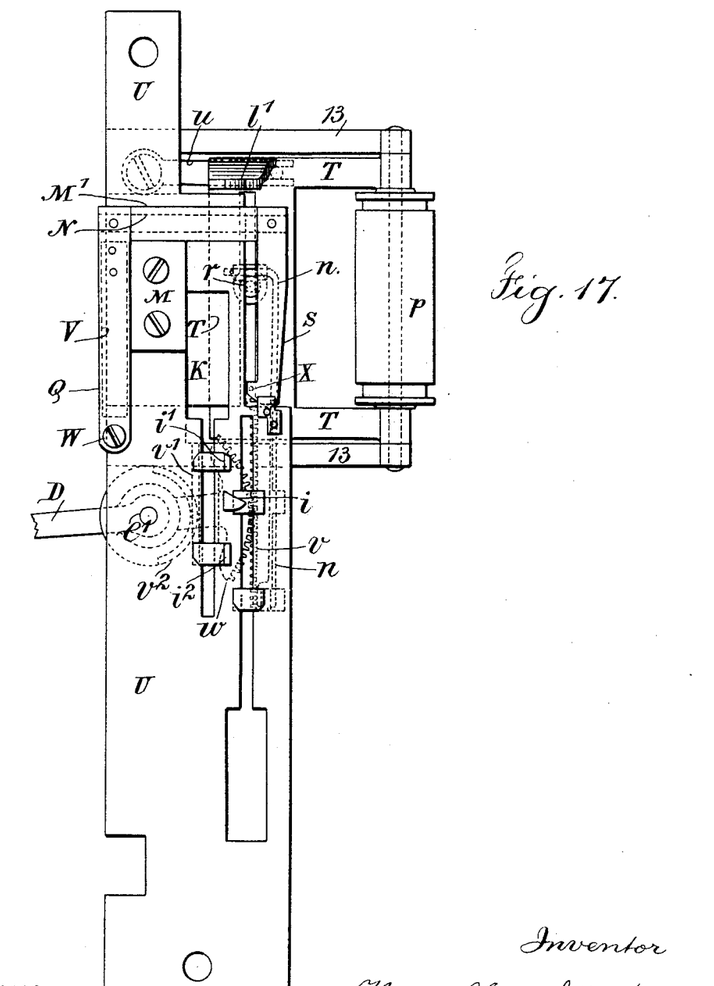
Fig. 17 is a rear elevation of the slotted plate U and the mechanism connected therewith including the index hand.

As seen in Fig. 8, the paper strip is divided into a series of longitudinal lines marked from 0 to 90 inclusive, these figures denoting miles or kilometers. A slotted metal plate U Figs. 1 and 17 is secured at its respective ends by the screws 12 to the casing P. This slotted plate carries the index hand D whose outer pointed end is adapted to sweep over the index D' upon whose face are numbered divisions from 0 to 90 corresponding with the parallel lines upon the paper strip.

Figure 18:
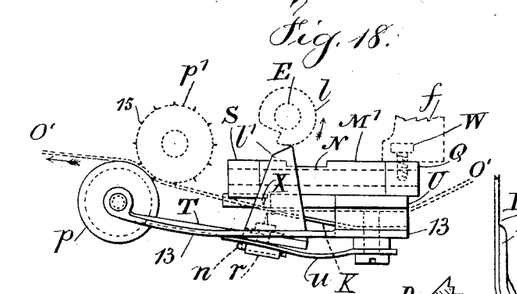
Fig. 18 is a plan view of the parts shown in Fig. 17 with the adjacent mechanism thereto shown in dotted lines.
Figure 21:
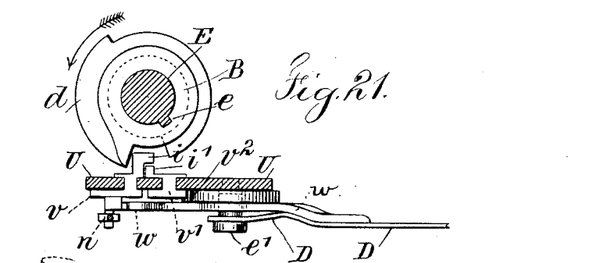
Fig. 21 is a sectional plan of the parts shown in Fig. 19.
Figure 22:
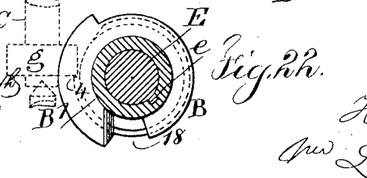
Fig. 22 is a sectional plan through the drop bolt.

The index hand D is pivoted by a screw $e'$ to the plate U and the lower end of said index hand, as shown particularly in Figs. 19 and 21, is made as a spring, the object of which is to hold the index hand to the slotted plate U with the desired degree of friction until changed by a positive motion. The index hand D carries a toothed segment $w$ and a pinion $v^2$. The segment $w$ meshes with the vertical rack $v$ and the pinion $v^2$ meshes with the secondary rack $v'$; these racks $v$ and $v'$ have projecting arms that pass through the guide slots of the plate U and form slide ways for the vertical movement of said racks, there being studs $i$ upon the rack $v$ and studs $i'$ $i^2$ upon the rack $v'$, and as shown in Figs. 3, 17, and 19, the studs $i$ and $i^2$ are close to the upper surface of the rim $k'$ of the drop bolt B, and the studs $i$ and $i'$ when they are moved come in the path of the helical incline $d$ upon the sleeve B' of said drop bolt. Hence when the drop bolt B is raised the rim $k'$ moves the studs $i$ $i^2$ and swings the hand D from zero to the figure denoting the speed at which the locomotive or vehicle is traveling, and the incline $d$ acts to move the hand nearer to the zero mark with each decrease in speed and to return the hand to zero as the drop bolt is rotated after the locomotive is stopped. The incline $d$ is notched see Figs. 2ᵃ, 19, and 21 so that the lower part is of less reach than the upper part. The whole helical incline acts upon the stud $i$ but only the upper part acts on the stud $i'$, so that one or the other of these studs is acted on with each half revolution of said spiral in returning the index hand to a normal position. A spring frame 13, (see Figs. 1, 17, and 18,) connected to the upper portion of the slotted plate U carries the friction roller $p$, and a vertically slotted frame T (see Figs. 1 and 17) is pivoted to the axis of the roller $p$ within the arms of the frame 13, and upon the back of this frame T there is a wedge-shaped arm $l'$ that comes in the path of and is operated by the cam disk $l$ upon the upper end of the auxiliary spindle E, the rotation of which cam disk with the auxiliary spindle causes a backward and forward movement to the frame T by means of the arm $l'$, in conjunction with the spring $u$, that acts to press the frame T toward the spindle E. A sliding head $r$ is connected by a rod $n$ (see Figs. 1 and 17) to the lower end of the rack $v$ and said head $r$ is adapted to move vertically in the slot of the frame T, and projecting from the inner surface of the head $r$ is a pin or puncturing point whose office is to puncture the paper strip and form a line of dots such as is shown in Fig. 8 at 1, the position of each of which dots is according to the speed being traveled and agrees with the speed indicated by the index hand D on the index D'. A spring $u$ fastened to the face of the frame 13 bears against the face of the slotted frame T and tends to press the same inward, the cam disk $l$ and the arm $l'$ acting to keep the frame T pressed outwardly with the penetrating point away from the strip of paper for the greater portion of the revolution of the cam disk $l$, and with each revolution of said cam disk the wedge-shaped arm $l'$ is pressed into the notch of the cam disk $l$ by this spring $u$ and the sliding head $r$ is simultaneously moved forward so that its point punctures the paper, and this is accomplished regardless of the vertical position of the sliding head $r$. Upon the back of the slotted plate U a plate M is secured, the upper end of which is made with the sleeve M', (see Figs. 9 and 17) and a pivot pin N passes through this sleeve and has secured to it the depending arms S and Q, the arm Q carrying a spring V which bears against the inner face of the slotted plate U to press away from said plate both the arms Q and S. The lower end of the arm V carries a set screw W and the lower end of the arm S carries a penetrating pin X.

The strip of paper O' wound upon the roller O passes therefrom over the face of the slotted plate U, (see Fig. 18) and there is a spring plate K secured upon the back of the frame 13 and whose free edge extends to near the edge of the slotted plate U, and the paper strip O' passes behind this spring plate K and through between the rollers $p$ $p'$ and so on into the receptacle L. One or more springs of usual form are preferably employed to keep the strip of paper O' taut, and such springs are shown at 25, Fig. 2, and 26 Fig. 1ª.

The meeting edges of the slotted plate U and the spring plate K are adjacent to the penetrating point on the back of the sliding head $r$ (see Fig. 18) and also adjacent to the penetrating point X, so that the paper is held at this point for the operation in both directions of said penetrating points.

Figures 11, 15:
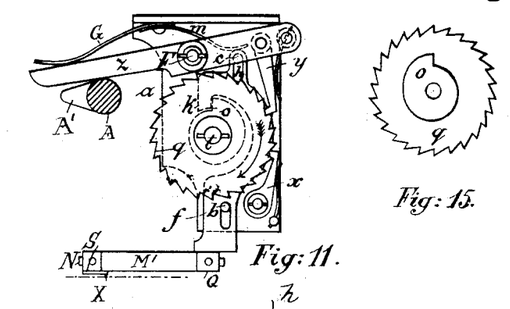
Figure 12:
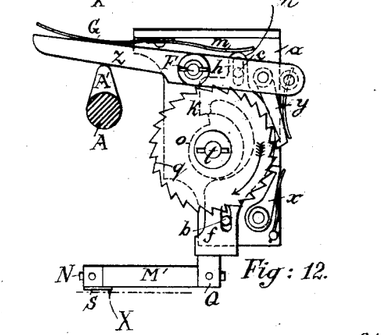
Fig. 12 is a plan of the parts shown in Fig. 11 in the position they assume as moved by their operating cam.
Figure 13:
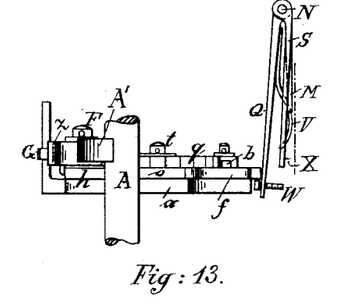
Fig. 13 is a side elevation of the parts shown in Fig. 12.
Figure 14:
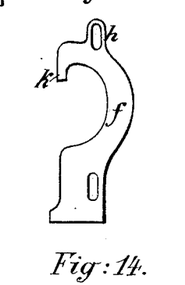
Fig. 14 is a plan of the hammer plate separately.

A bracket bed plate $a$ (see Figs. 1ª and 9 to 13 inclusive) is secured to the casing P of the mechanism, and said plate $a$ carries pins $b$ $c$. A hammer or striking plate $f$, shown in Fig. 14, is provided with openings or mortises for the pins $b$ $c$, there being a shoulder $h$ to said hammer plate $f$ and a nose $k$, and said hammer plate $f$ is adapted to be moved over the face of the bed plate $a$ upon which it rests. A ratchet $q$ and cam $o$ are connected together and pivoted at $t$ to this bed plate $a$; the cam and ratchet are shown separate in the inverted plan Fig. 15, the cam $o$ with the ratchet $q$ being adapted to rotate in the direction of the arrow Fig. 11 and the cam to operate the nose $k$ of the plate $f$ and move said plate $f$ backwardly upon the bed plate. The outer end of this hammer plate $f$ takes against the arm Q above the said screw W. A spring retaining pawl $x$ (see Figs. 11 and 12) engages the teeth of the ratchet $q$, and a spring pawl $y$ pivoted to a lever $z$ is used to turn the ratchet wheel $q$ and said lever $z$ is pivoted at F to the bed plate $a$, and the outer end of this lever $z$ is in the path of the cam A' on the spindle A and by which this lever $z$ is moved. A spring G connected to the bed plate $a$ (see Figs. 11 and 12) bears against the lever $z$, and a spring $m$ bears against the end of the shoulder $h$ of the hammer plate $f$, the spring G acting to press the lever $z$ against the cam A', and the spring $m$ presses the hammer plate $f$ outwardly toward the arm Q.

By the rotation of the spindle A and its cam A' the lever $z$ is rocked back and forth, and by the pawl $y$ attached thereto the ratchet $q$ is turned a tooth at a time and is held as turned by the pawl $x$. This movement rotates the cam $o$ in the direction of the arrow Fig. 11, and gradually draws back the hammer plate $f$ until from the position, Fig. 11, one complete rotation is made, and as the nose of the cam $o$ passes the nose $k$ of the hammer plate $f$ the spring $m$ gives said hammer plate $f$ a forward movement. This takes place once in each rotation of the ratchet $q$ and the cam $o$. The hammer plate $f$ in its forward movement operates the arms Q and arm S and strikes the penetrating point X of the arm S into the strip of paper from the back, thus puncturing the paper once for each rotation of the ratchet $q$ and cam $o$; and it will be seen that the speed of these parts is controlled entirely by the speed of the spindle A, so that each puncture that is made with the penetrating point X represents a certain uniform distance traveled regardless of the speed of travel, and as shown, one puncture is presumed to be made for each mile or kilometer, as indicated in Fig. 8 by the dots upon the line 3 just below the zero line.

The cam $o$ might be a two-part cam so as to cause one puncture for each half rotation which would represent half miles or kilometers.

A gong Y (Figs. 1, 1ª, and 3) is mounted upon a standard upon the top of the casing P and upon the upper end of the spindle A where the same projects through the casing P there is a cam $u'$. A hammer arm $y'$ is pivoted to a stud upon the top of the casing P and the same carries the striker $t'$ and its spring arm. The hammer arm $y'$ is bent into the form of a right angle, its free outer end engaging the cam $u'$. A spring 17 is connected to the hammer arm $y'$ and its free end rests against the standard carrying the gong, and the office of the spring 17 is to keep the free end of the hammer arm $y'$ pressed against the cam $u'$ (see Fig. 7) so that when in the rotation of the cam its notch comes opposite the free end of this hammer arm, the same will drop into the notch and allow the striker $t'$ to give a blow upon the gong and produce an alarm. A spindle $z'$ (see Figs. 1, 1ª, and 7) passes through the casing P, and, as seen in Fig. 1ª, descends to some depth below the inner face of the casing, and there is a head upon the upper end of said spindle $z'$ above the casing P, and an auxiliary arm $y^2$ connected to the arm $y'$ comes against this spindle head and prevents the movement of the hammer arm $y'$ or the striker by the rotation of the cam $u'$ except when an excessive speed is attained.

In attaining an excessive speed the drop bolt B is raised upon the auxiliary spindle E by the means herein described to such a height that the upper end of the sleeve B' of said drop bolt during one rotation thereof comes against the under end of the spindle $z'$ and raises the same, thus liberating the hammer arm $y'$, and then when the notch of the cam $u'$ comes around, the free end of said hammer arm drops therein and the striker sounds the alarm upon the gong, calling the attention of the engineer to the excessive speed. With a reduction in the speed the spindle $z'$ is no longer held up and drops in behind the auxiliary arm $y^2$ and prevents the hammer striking the bell.

In the operation of the parts it is to be understood that the spindle A, shaft C, and connected pinions, and gear rotate in proportion to the speed the engine or other vehicle is traveling, and that the speed of the auxiliary spindle E is regulated as to time by the train of gearing and governed by the balance wheel and escapement or clock-work mechanism H and is unaffected by the speed of the spindle A, the winding up motion however being communicated to the spring barrels by the pawl that is moved by the spindle A. The drop bolt B is rotated with the time mechanism and auxiliary spindle E once in each twelve seconds of time and while being rotated the toothed pinion $g$ raises the bolt and it drops once each rotation because of the cut away portion of the peripheral ribs herein before named. The height however to which this drop bolt is raised with each revolution is regulated by the speed of travel of the spindle A and shaft C; the greater the speed the higher the drop bolt will be raised each rotation and vice versa, and as this drop bolt comes down each time it strikes and rests upon the forked block $w'$ but continues to rotate with uniformity of speed. This block $w'$ and the sleeve $w^2$ to which it is connected are being raised and lowered to a slight extent by the rotation of the notched cam disk $m'$ with the shaft A, the object being to slightly lift the drop bolt B for accurately engaging the toothed pinion $g$ and peripheral ribs as the drop bolt rotates, the parts being so made that as the block $w'$ rests upon an incline on the upper edge of the notched disk $m'$ the drop bolt will be moved upwardly, its inertia overcome, and the peripheral ribs will exactly mesh with the teeth of the pinion $g$, so that the upward movement of the drop bolt is again effected and wear and strain on the pinion and ribs are lessened. The elevation of the drop bolt B between one drop and the next is in proportion to the speed and the rim $k'$ acts below the stud $i$ (see Fig. 19) to raise the same and through it the rack $v$, toothed segment $w$, and the index hand D are moved and, to whatever extent the drop bolt is raised by the speed or accelerations of speed, the index hand D denotes it on the index D', and the pressure of the pivot screw $e'$ bends the spring end of the hand D and produces a friction sufficient to hold the index hand D, the racks $v\ v'$, and the parts connected therewith in place when the drop bolt B falls, and should the drop bolt at the next elevation be raised farther the hand D is again moved to indicate it. The auxiliary spindle E and the drop bolt B are rotated in the direction of the arrow Fig. 2ª so that the top end of the helical incline $d$ is the advancing end, and the object of this is that as the speed lessens the said incline runs over and presses down the stud $i$, and in so doing the end of the index hand is moved toward the 0 point, and the upper wider portion of the incline $d$ is adapted to bear upon the stud $i'$ to effect the same purpose so that either one part or the other of said helical incline is sure to engage either of the studs $i$ or $i'$ in bringing the index hand back to 0 either as the speed lessens or after the engine has stopped while the clock mechanism is running down. There is a notch 18 (see Figs. 1ª, 19, and 22) in the rim $k'$ of the drop bolt, and the advancing edge of this notch 18 agrees in a vertical line with the lower end of the helical incline $d$ and the upper end of the incline $d$ agrees vertically with the rear edge of said notch 18. This notch 18 is at a point in the circumference of the drop bolt one-quarter of the circumference of said drop bolt away from the vertical edge 4 of its ribbed surface. These parts of the drop bolt are in such relation to the studs $i\ i'$ that when the ribs of the drop bolt clear the pinion $g$ and the drop bolt falls the notch 18 and the ends of the incline $d$ prevent the drop bolt from acting on the studs $i$ or $i'$. Hence the hand remains stationary by friction, and when the drop bolt is raised during its next rotation it does not move the hand if the speed of travel is unchanged, because it only rises until the rim $k'$ reaches such studs and then the bolt again drops. If the speed has been increased the rim $k'$ lifts the studs in the latter part of the rotation of the drop bolt to indicate the augmented speed by the hand D. If the speed of travel is slackened the drop bolt will not have been raised so high and the lower end of the incline $d$ acts upon the studs $i\ i'$ to move the hand and indicate the less speed. When the engine stops the time movement continues to rotate the spindle E and drop bolt, but as the latter is not lifted, the incline $d$ acts on the studs $i\ i'$ until the hand D is moved to 0, and the distance between the lower end of the incline $d$ and the surface of the rim $k'$ is sufficient for the studs $i\ i^2$, so that said parts pass above and below the studs as the spindle E continues to rotate until it is stopped, the hand D remaining at zero. It will also be seen that with the elevation of the drop bolt B and the consequent operation thereby of the index hand D the rod $n$ and the sliding head $r$ are moved up and down in the slot in the frame T, the position of said sliding head $r$ agreeing with the position of the index hand D upon the index D', so that when the spring $u$ operates the frame T and the sliding head $r$ to throw the same forward and puncture the paper strip O' the punctures are made upon the line of dots 1 of the paper strip coinciding with the position of the index hand and that this position changes with the speed, because the drop bolt is raised in proportion to the speed. Thus upon the paper strip, as shown in Fig. 8, there are indicated by the line of dots 2 periods of time, say three minutes apart; and by the line of dots 3 below the 0 line made by the penetrating point X are indicated miles or kilometers or fractional parts thereof; and upon the face of the strip by the line of dots 1 of the diagram curve in their relation to the horizontal lines of the strip is indicated the speed of travel; a record thus being made of the periods of time, the distance, and the speed for future use.

Having reference to the lines of perforations 2, 2 that indicate the minute periods, the perforations in the line 3 that indicate miles or kilometers, and the diagram curve of perforations 1, a rectangle can be marked on the strip, as indicated in Fig. 8, to denote the average speed in miles or kilometers.

I claim as my invention—

1. The combination in a speed and distance recording apparatus, of a spindle and mechanism for rotating the same by the movement of the vehicle, a clock or time mechanism, a spring for driving the same, an auxiliary spindle rotated by the time mechanism, rollers for feeding along a strip of paper, and gearing connecting one roller to the time mechanism, an indicating hand and mechanism for acting upon the same by the movement of the vehicle, a pin adjacent to the paper strip, a connection from the same to the hand, and mechanism brought into action by the time mechanism for pressing the pin into the paper periodically, substantially as set forth.

2. The combination in a speed and distance recording apparatus, of a spindle and mechanism for rotating the same by the movement of the vehicle, a time mechanism, a spring for driving the same, an auxiliary spindle rotated by the time mechanism, rollers having penetrating pins in the surface of one of the rollers for feeding along a strip of paper, and gearing connecting one roller to the time mechanism, an indicating hand and mechanism for acting upon the same by the movement of the vehicle, a pin adjacent to the paper strip, a connection from the same to the hand, and mechanism brought into action by the time mechanism for pressing the pin into the paper periodically, substantially as set forth.

3. In a speed and distance recording instrument, the combination with the spindle A, the eccentric R and the auxiliary spindle E, of the springs I connected at their respective ends to their own barrel and the adjacent hub, the toothed wheel 7 and pawl R' operated by the eccentric R, the toothed wheel 6, the balance wheel mechanism H engaging the wheel 6 and the wheel 10 upon the spindle E also engaging the wheel 6, substantially as and for the purposes set forth.

4. In a speed and distance recording apparatus, the index hand D, the pinion $v^2$ and toothed segment $w$ formed with or connected thereto and the pivot screw $e'$, of the slotted plate U to which said hand is pivoted, the rack $v$ engaging the segment $w$, the rack $v'$ engaging the pinion $v^2$, slideways for said racks to move vertically in the slotted plate U, the stud $i$ on the back of the rack $v'$ and the stud $i'$ on the back of the rack $v$, the index D', means for periodically engaging the stud $i'$ to operate the hand D and means for engaging the studs $i$ $i'$ in returning the hand to the zero or normal point, substantially as set forth.

5. The combination of a spindle and mechanism for driving the same by the movement of the vehicle, a time mechanism, an auxiliary spindle driven by the time mechanism, a drop bolt upon said spindle, and mechanism for raising the drop bolt from the movement of the vehicle and allowing the same to drop, an index hand, and mechanism acted upon by the drop bolt for raising the index hand, rollers for moving a strip of paper along, a penetrating point for acting upon the paper, and means for connecting the same with the index hand, substantially as set forth.

6. The combination of a spindle and mechanism for driving the same by the movement of the vehicle, a time mechanism, an auxiliary spindle driven by the time mechanism, a drop bolt upon and rotating with said auxiliary spindle, and mechanism for raising the drop bolt from the movement of the vehicle and allowing the same to drop, an index hand, and mechanism acted upon by the drop bolt for moving the hand, rollers for moving a strip of paper along, mechanism for driving the rollers by the time movement, a penetrating point for acting upon the paper, and means for connecting the same with the indicating hand, substantially as set forth.

7. The combination of a spindle and mechanism for driving the same by the movement of the vehicle, a time mechanism, an auxiliary spindle driven by the time mechanism, a drop bolt upon said spindle, and mechanism for raising the drop bolt from the movement of the vehicle and allowing the same to drop, an index hand, and mechanism acted upon by the drop bolt for moving the hand, rollers for moving a strip of paper along, pins upon the surface of one of the rollers to penetrate the paper and indicate periods of time, mechanism for driving the rollers by the time movement, a penetrating point for acting upon the paper, and means for connecting the same with the indicating hand, substantially as set forth.

8. The combination in a speed and distance recording apparatus, of a spindle and mechanism for rotating the same from the movement of the vehicle, a time mechanism, an auxiliary spindle and the rollers driven by the time mechanism, a strip of paper moved by the rollers, pins projecting from one of the rollers and penetrating the paper and indicating periods of time, a penetrating point for puncturing the paper and indicating when the vehicle has traveled a given distance such as a mile or kilometer, and a cam and ratchet mechanism actuated by the spindle for operating said penetrating point, substantially in the manner and for the purposes set forth.

9. The combination in a speed and distance recording apparatus, of a spindle and mechanism for rotating the same from the movement of the vehicle, a time mechanism, an auxiliary spindle, and the rollers driven by the time mechanism, a strip of paper moved by the rollers, pins projecting from one of the rollers and penetrating the paper and indicating periods of time, a penetrating point and mechanism connected with the spindle that is rotated by the movement of the vehicle for penetrating the paper when the vehicle has traveled a given distance such as a mile or kilometer, a hand, and mechanism for moving the same to indicate the speed of the vehicle, a puncturing point adjacent to the paper, mechanism connecting the same to the indicating hand, and mechanism receiving its movement from the time mechanism for impressing the latter point in the paper at regular intervals of time, substantially as set forth.

10. The combination in a speed and distance recording instrument, of a spindle and mechanism for rotating the same from the movement of the vehicle, a time mechanism, a spring for actuating the same, an auxiliary spindle rotated by the time mechanism, a drop bolt upon the said auxiliary spindle having interrupted peripheral ribs, a pinion connected with the spindle that is rotated by the movement of the vehicle, said pinion engaging the ribs on the drop bolt and acting to raise the same—the drop bolt falling when the interrupted ribs separate from the pinion—an indicating hand and mechanism acted upon by the drop bolt for moving the hand by the elevation of the drop bolt according to the speed of the vehicle each revolution of said drop bolt, substantially as set forth.

11. The combination in a speed and distance recording instrument, of a spindle and mechanism for rotating the same from the movement of the vehicle, a time mechanism, a spring for actuating the same, an auxiliary spindle rotated by the time mechanism, a drop bolt upon the said auxiliary spindle having interrupted peripheral ribs, a pinion connected with the spindle that is rotated by the movement of the vehicle, said pinion engaging the ribs on the drop bolt and acting to raise the same—the drop bolt falling when the interrupted ribs separate from the pinion—a friction device for holding the indicating hand when not otherwise acted upon, a slotted plate supporting the pivot of the hand, and studs projecting through the slots of the plate, a toothed mechanism for connecting the same with the hand, a rim upon the drop bolt for acting upon the studs in one direction, and an incline upon the drop bolt for acting upon the studs in the other direction in moving the hand, substantially as set forth.

12. The combination in a speed and distance recording instrument, of a spindle and mechanism for rotating the same from the movement of the vehicle, a time mechanism, a spring for actuating the same, an auxiliary spindle rotated by the time mechanism, a drop bolt upon the said auxiliary spindle having interrupted peripheral ribs, a pinion connected with the spindle that is rotated by the movement of the vehicle, said pinion engaging the ribs on the drop bolt and acting to raise the same—the drop bolt falling when the interrupted ribs separate from the pinion—an indicating hand, and mechanism acted upon by the drop bolt for moving the hand by the elevation of the drop bolt according to the speed of the vehicle each revolution of said drop bolt, rollers and mechanism for driving the same from the time movement for moving a strip of paper progressively, a point and connection to the indicating hand for describing upon the strip of paper the speed curve, substantially as set forth.

13. The combination in a speed and distance recording apparatus, of a spindle and mechanism for rotating the same from the movement of the vehicle, a time mechanism, a spring for actuating the same, an auxiliary spindle rotated by the time mechanism, a drop bolt upon the said auxiliary spindle having interrupted peripheral ribs, a pinion connected with the spindle that is rotated by the movement of the vehicle, said pinion engaging the ribs on the drop bolt and acting to raise the same—the drop bolt falling when the interrupted ribs separate from the pinion—an indicating hand and mechanism acted upon by the drop bolt for moving the hand by the elevation of the drop bolt according to the speed of the vehicle each revolution of said drop bolt, rollers having projecting points to move a strip of paper and penetrate the same to indicate periods of time, a connection from such rollers to the time mechanism, a puncturing point and mechanism connecting the same with the indicating hand, and mechanism receiving its movement from the time mechanism and pressing the point into the paper periodically, substantially as set forth.

14. The combination in a speed and distance recording instrument, of a spindle and mechanism for rotating the same by the movement of the vehicle, a time mechanism, a spring for actuating the same and mechanism driven by the movement of the vehicle for winding up the spring, an auxiliary spindle rotated by the time mechanism, a drop bolt upon the same, means for raising the drop bolt and allowing it to fall, an indicating hand and mechanism on the drop bolt for moving the same, a bell, a hammer for striking the same, and mechanism actuated by the movement of the vehicle for moving the hammer, a spindle and stop for holding the hammer out of action except when the maximum speed is attained and the stop is raised by the drop bolt, substantially as set forth.

15. The combination with the time mechanism, of an auxiliary spindle rotated by the same, a drop bolt upon the said spindle having interrupted peripheral ribs, a pinion for engaging the peripheral ribs and mechanism for driving the same by the movement of the vehicle, an indicating hand and mechanism actuated by the drop bolt for moving the hand, a notched disk rotated by the movement of the vehicle, and a forked rest block acted upon by the notched disk for commencing the upward movement of the drop bolt, substantially as set forth.

16. The combination in a speed and distance recording apparatus, of a time mechanism, rollers for feeding a strip of paper, gearing connecting the rollers with the time mechanism, a spring actuated hammer plate, a puncturing point operated by the hammer plate and penetrating the paper, a spindle and cam A' and means for rotating the same by the movement of the vehicle, a cam o for acting upon the hammer plate in one direction, a ratchet wheel, a pawl and a lever receiving their motion from the cam A' for actuating the cam o and moving the hammer plate, substantially as set forth.

17. The combination with the pinion g and mechanism for rotating the same by the movement of the vehicle, of the drop bolt having interrupted peripheral ribs, a time mechanism and gearing and an auxiliary spindle for rotating the drop bolt, an indicating hand, a friction mechanism for holding the hand when not otherwise acted upon, segmental gears connected with the hand, a supporting plate having slots, toothed racks engaging the segmental gears, studs projecting from the racks, a notched rim upon the drop bolt for acting upon the studs in one direction and a helical incline for acting upon the studs in the other direction to set and return the hand, substantially as set forth.

18. The combination with the pinion g and mechanism for rotating the same by the movement of the vehicle, of the drop bolt having interrupted peripheral ribs, a time mechanism and gearing and an auxiliary spindle for rotating the drop bolt, an indicating hand, a friction mechanism for holding the hand when not otherwise acted upon, segmental gears connected with the hand, a supporting plate having slots, toothed racks engaging the segmental gears, studs projecting from the racks, a notched rim upon the drop bolt for acting upon the studs in one direction and a helical incline for acting upon the studs in the other direction to move the hand, a roller having projecting pins for moving a strip of paper, gearing for driving the roller from the time mechanism, a puncturing point and connection to the hand for indicating upon the strip of paper the speed curve, means for holding the rolled up strip of paper, a case for receiving the paper after it passes through the apparatus, and a curved spring in the receiving case for directing the paper as it is rolled up, substantially as set forth.

19. The combination in a speed and distance recording apparatus, of a time mechanism, a roller and gearing connecting the same with the time mechanism, pins upon the roller for indenting the strip of paper and indicating periods of time, an indicating hand, a puncturing point and a connection from the hand to the point, means for pressing the point into the paper at stated intervals of time, a puncturing point and mechanism receiving its motion from the moving vehicle for pressing the point into the paper at regular distances of travel such as a mile or kilometer, the strip of paper being divided by longitudinal lines indicating the speed of movement, substantially as set forth.

20. In a speed measuring apparatus, the combination with an index hand and index, of means for feeding along the paper strip with a uniform progressive movement and for marking thereon to indicate periods of time, means for moving the index hand over the index, and means connected with said hand for simultaneously recording upon the paper strip the ratio of speed indicated by said hand, and means actuated by the movement of the vehicle for indicating by a line of dots upon the paper strip the distance traveled in miles, kilometers or fractions thereof, substantially as and for the purposes set forth.

21. In a speed and distance recording instrument, the combination with the spindle and mechanism for actuating the same by the movement of the vehicle, the gear s and pinion s', the shaft C and pinion g, of the drop bolt B having parallel interrupted peripheral ribs adapted to be engaged by the pinion g for raising such drop bolt in proportion to the ratio of speed traveled, the alarm mechanism, and means actuated by the rise of the drop bolt to release the alarm mechanism when the speed is excessive, substantially as specified.

22. In a speed and distance recording instrument, a drop bolt B having parallel peripheral ribs extending from a vertical line 4 partially around its circumference, there being a plain longitudinal portion between the ribs, in combination with means for rotating the drop bolt from a time mechanism, and means for raising the drop bolt from the movement of the vehicle, substantially as and for the purposes set forth.

23. In a speed and distance recording apparatus, the slotted plate U and the index hand and toothed mechanism connected therewith; of the slotted frame T, the sliding head $r$ carrying a penetrating point, the rod $n$ connecting said head with the index hand mechanism, whereby the head is raised and lowered as the hand is turned, means for periodically holding the frame T outward and the penetrating point from the paper, and the spring $u$ for periodically pressing said parts forward to puncture the paper, substantially as specified.

24. In a speed and distance recording instrument, the combination with a strip of paper, of the auxiliary spindle E, the friction roller $p$ and the feed roller $p'$ between which the strip of paper passes, the clockwork mechanism giving motion to the auxiliary spindle, and the train of gears connecting the said auxiliary spindle with the feed roller $p'$, whereby a regular progressive movement is imparted to the paper strip, means for winding the clock mechanism by the movement of the vehicle, and mechanism for marking the paper at regular intervals of time, substantially as set forth.

25. In a speed and distance recording instrument, the combination with the strip of paper and the roller O therefor, of the receptacle L for the free end of the paper strip and a bent spring 11 in said receptacle for directing the said strip of paper to form a coil as fed into the receptacle, substantially as specified.

In testimony that I claim the foregoing as my invention I have signed my name in presence of two subscribing witnesses.

HUGO HAUSSHÄLTER.

Witnesses:
GEORG RICHTER,
WILHELM WIESENHÜTTER.